Jan. 10, 1967   N. J. KRUG ETAL   3,297,378
AUTOMATIC EJECTOR POWER FILING APPLIANCE
Filed April 8, 1965   8 Sheets-Sheet 1

INVENTORS
Newton J. Krug, Carl D. Graber
and Leo J. Grossmiller, Jr.
BY Frease, Bishop, Johns & Schick
ATTORNEYS

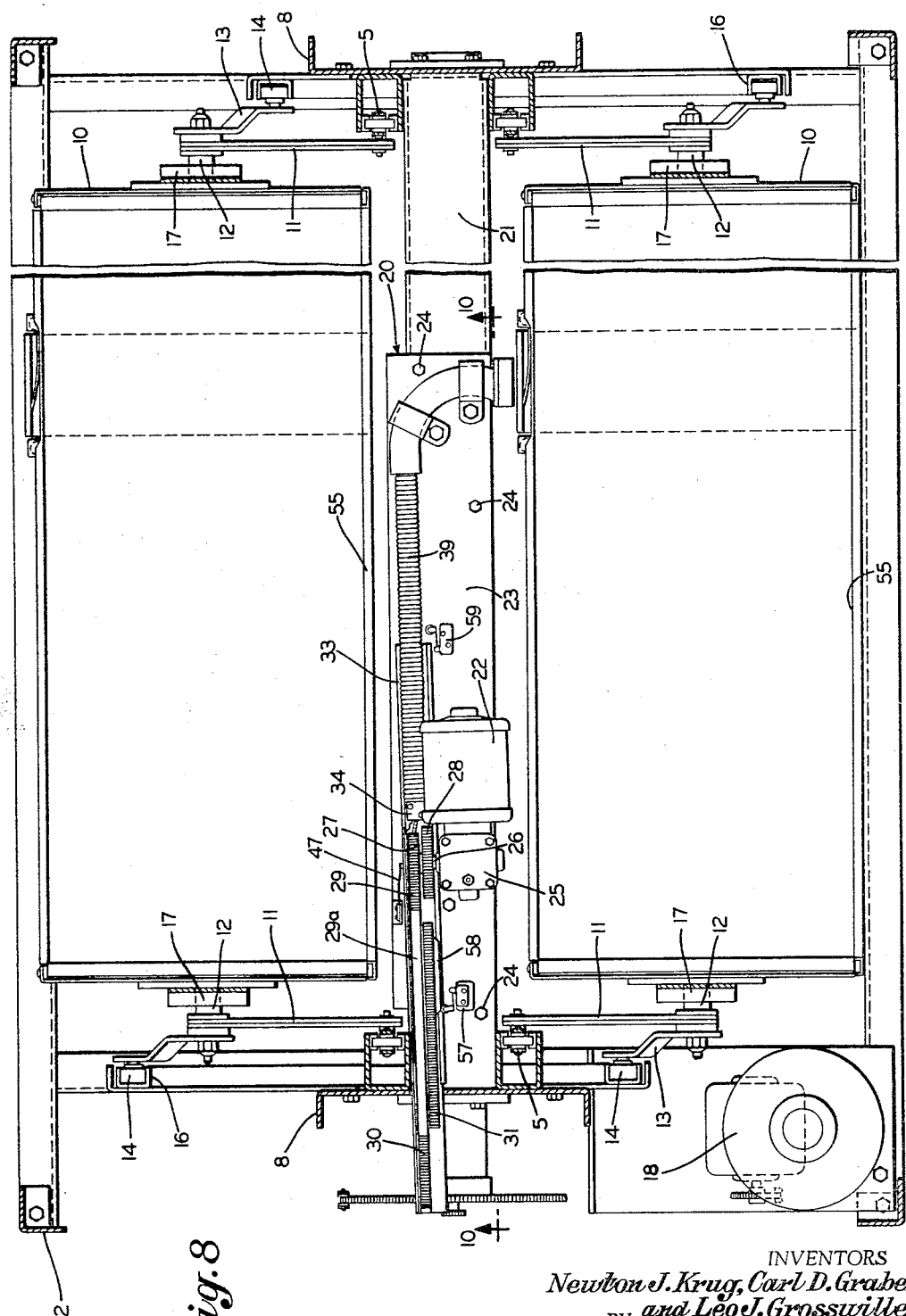

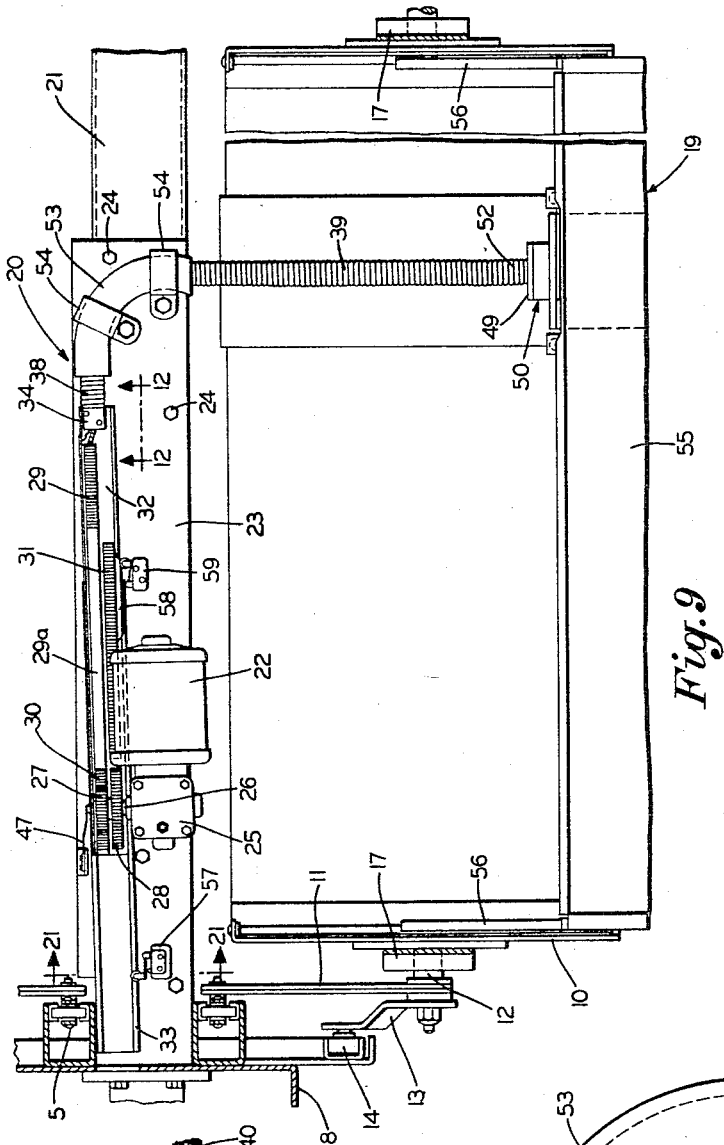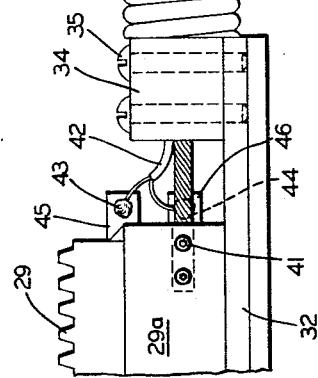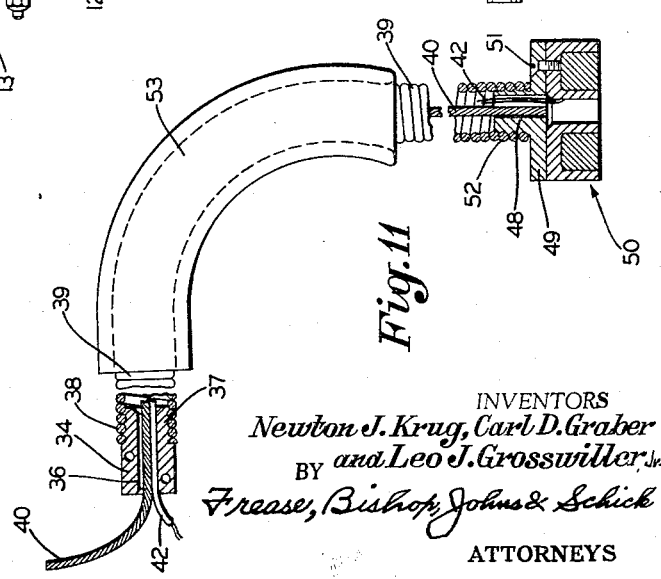

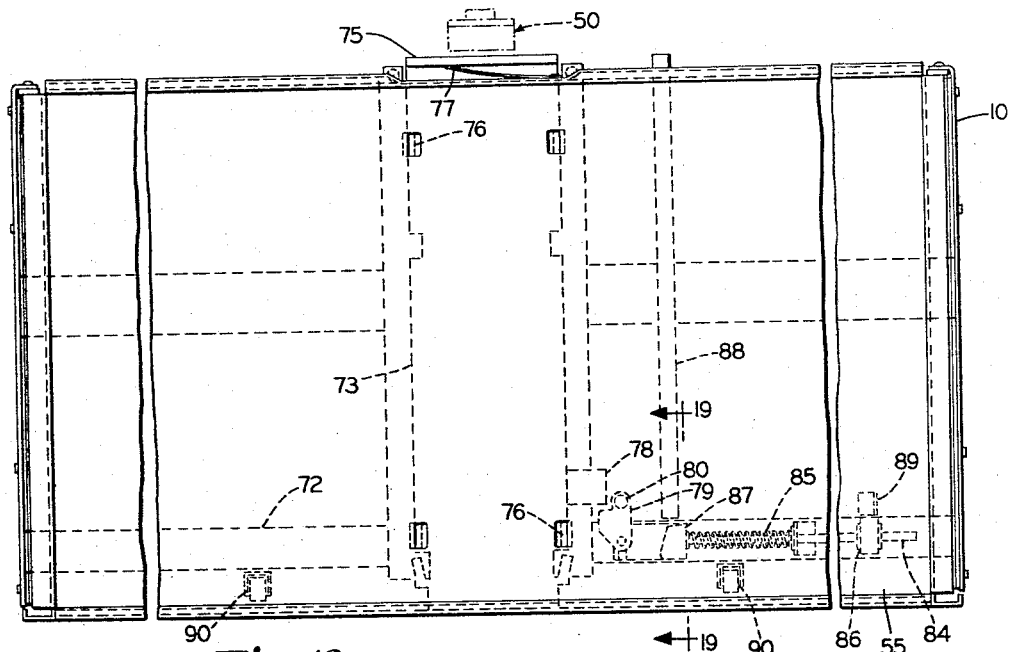
Fig.13
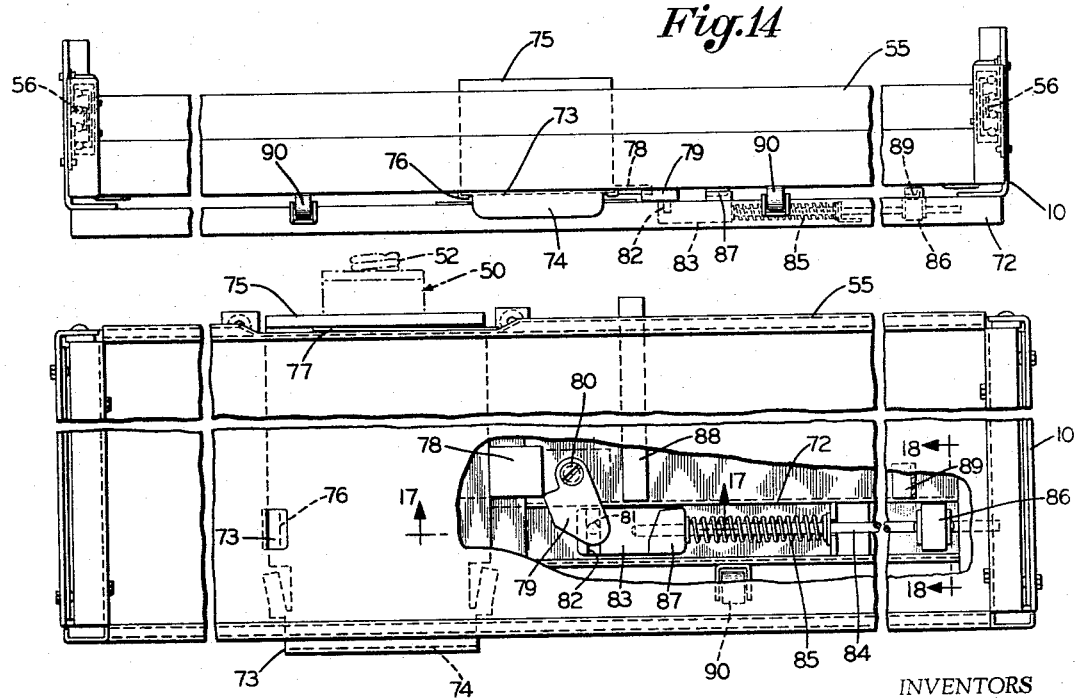
Fig.14
Fig.15

Jan. 10, 1967     N. J. KRUG ETAL     3,297,378
AUTOMATIC EJECTOR POWER FILING APPLIANCE
Filed April 8, 1965     8 Sheets-Sheet 6

INVENTORS
Newton J. Krug, Carl D. Graber
and Leo J. Grosswiller, Jr.
BY
Frease, Bishop, Johns & Schick
ATTORNEYS

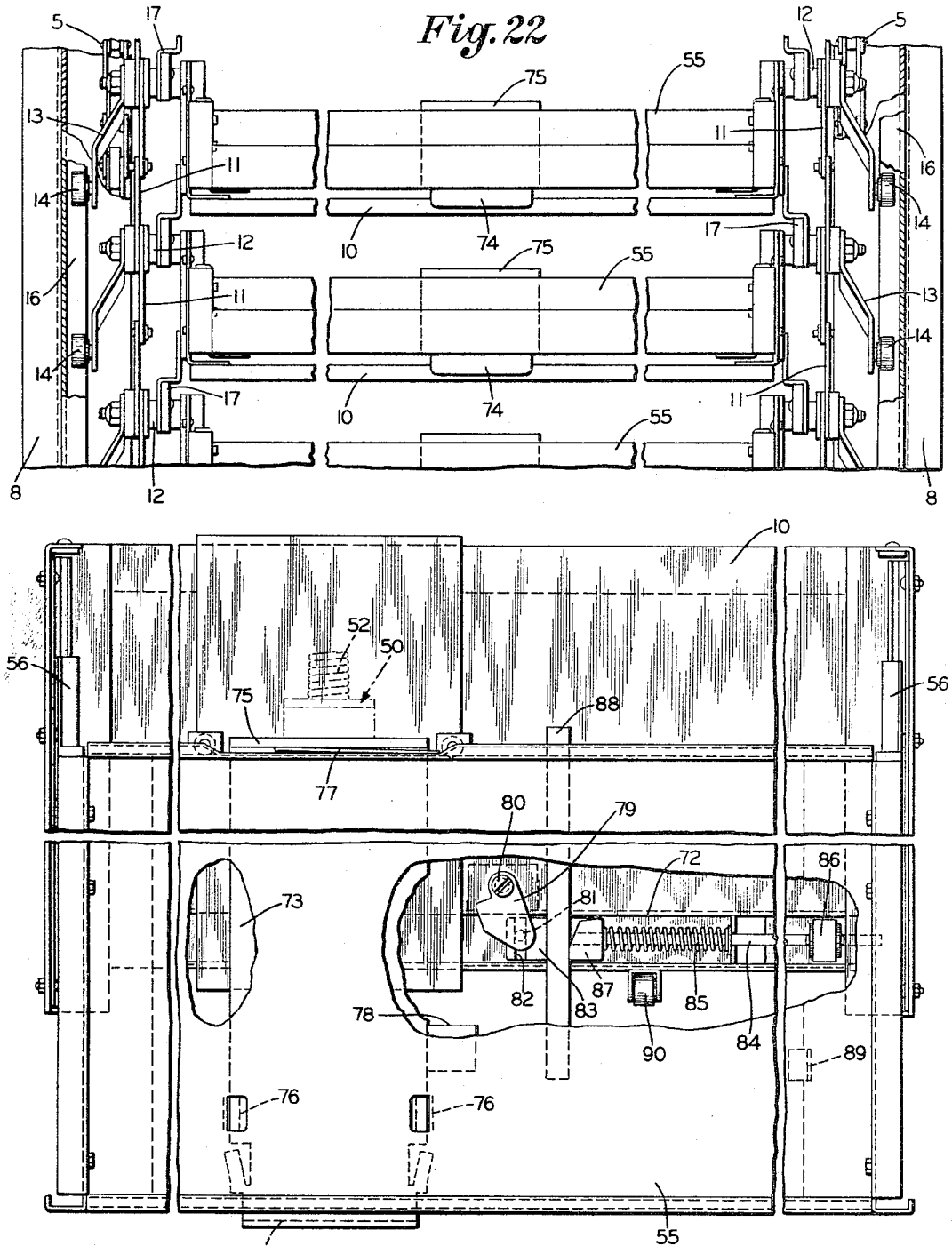

3,297,378
AUTOMATIC EJECTOR POWER
FILING APPLIANCE
Newton J. Krug, Canton, Carl D. Graber, Orrville, and Leo J. Grosswiller, Jr., East Canton, Ohio, assignors to Diebold, Incorporated, Canton, Ohio, a corporation of Ohio
Filed Apr. 8, 1965, Ser. No. 446,682
16 Claims. (Cl. 312—223)

The invention relates to a mechanized or power filing appliance of a type in which a plurality of pans are mounted on an endless conveyor for movement in either direction in a continuous orbit of travel and any selected pan is delivered by power means at a work station, and in which a drawer, which may be latched in closed or retracted position, is supported on each pan on suspension mechanism which permits the drawer to be moved between retracted and extended positions at the work station; and more particularly the invention relates to drawer-moving mechanism coordinated with the pan-moving mechanism operative automatically upon pan arrival at the work station to power-eject to extended position a drawer on suspension mechanism on such arrived-pan, and operative to power-retract such drawer to retracted and latched position on said arrived-pan whenever drawer retraction is desired.

Prior constructions of filing appliances having pans mounted on a conveyor and carrying movable drawers have provided for drawer movement with respect to the individual pan for any drawer at a work station in several manners. First, the drawers have been mounted on suspensions on the pans for manual movement between extended and retracted positions.

Next, devices have been provided located in front of the drawers having grasping mechanism adapted to be moved to grasp the handle of the particular drawer located at the work station to pull it from or push it into filed position. Such front-mounted grasping mechanisms are undesirable because of being inconvenient to operate and use and of occupying space desired for other purposes.

Next, devices have been provided which include a transfer conveyor with ears or fingers located below the drawer when the later is delivered at a work station, for engaging and conveying the drawer into and out from filed position. Again, such transfer conveyors are complicated in construction and operation and occupy space needed for other purposes in front of the location of the drawers in their normal positions in the path of orbit travel.

Also, devices have been provided comprising a fork-lift truck-type carrier on a transfer elevator or transfer carrier to engage and lift a delivered drawer from a position in its orbit of travel, to an extended position at the work station. Here again, such lift devices, elevators, etc. are complicated in construction and require space desired for other uses in front of the file.

Next, another variation of a transfer carrier has involved a rectangular or U-shaped pull frame which surrounds a pan delivered in the orbit of conveyor travel at the location of the work station, and which picks up a drawer from such pan and supports the drawer during in and out movement thereof with respect to its pan. This construction materially limits the storage movements of the drawers and is not adapted for a filing device having an orbital travel arrangement.

Finally, other devices have been provided including a track having in and out paths moving each and every drawer in and out at the work station location during every movement of every drawer past the work station in orbital travel. This arrangement is not satisfactory since it requires every drawer to move in and out at the work station location every time the drawer passes such station during orbital movement of the file conveyor.

Thus, no known prior construction provides simple and readily operated mechanisms, which avoids occupying space desired or required for other purposes, for automatically moving drawers on suspensions on pans carried by a conveyor having orbital movement, between extended and retracted positions, when any selected drawer arrives at a work station.

It is, therefore, a fundamental object of the present invention to provide power mechanism which may be mounted on a file support frame between the vertical flights of travel of chain conveyor means on which pans are conveyed in orbital movement, which is operative on arrival of a selected pan at a work station automatically to move a drawer mounted on suspension means on such pan to an ejected position, and which may be power actuated to retract such pan from ejected to its home or retracted position in the path of orbital travel when desired.

Furthermore, it is an object of the present invention to provide improved drawer-moving mechanism of the character described having a thrust unit which transmits ejection and retraction thrust forces around a corner, to enable the drawer-moving mechanism to be located, mounted and housed between vertical flights of an endless conveyor carrying pans on which drawers to be ejected or retracted are suspended.

Moreover, it is an object of the present invention to provide drawer-moving mechanism of the character described including magnetic means for attaching and detaching the drawer-moving mechanism onto and from a drawer, to accomplish desired drawer ejection or retraction.

In addition, it is an object of the present invention to provide drawer-moving mechanism adapted for slow-fast-slow movement during ejection or retraction of any drawer on its pan suspension, in order to reduce shock to the file, pans and drawers during power operation of the drawer-moving mechanism.

Furthermore, it is an object of the present invention to provide a drawer-pan suspension construction on which a drawer may be moved between ejected and retracted positions by power-operated means, in which the drawer also may be moved manually, and in which the drawer may be latched in selected positions and is provided with laach interlocks so as to prevent orbital movement except when all drawers are in retracted and latched positions and to prevent power operation of the drawer-moving mechanism except when a drawer is in proper position to be ejected or retracted.

Moreover, it is an object of the present invention to provide desired control mechanisms for the operation of power file ejector-retractor mechanisms of the type set forth.

Finally, it is an object of the present invention to provide new power-operated ejector-retractor constructions for elevator-type files eliminating the difficulties heretofore encountered in the art, achieving the stated objects in a simple, effective and inexpensive manner, and solving problems and satisfying needs existing in the art.

These and other objects and advantages apparent to those skilled in the art from the following description and claims, may be obtained, the stated results achieved, and the desired difficulties overcome by the apparatus, combinations, parts, elements, sub-combinations, arrangements and constructions which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improved power-operated ejector-retractor construction for elevator or power files of the type in which a plurality of pans are mounted on an endless conveyor carried by support means for movement in either direction in a continuous orbit of travel and any selected pan is delivered by power means to a work station location, in which a drawer is supported on each pan on suspension mechanism which permits the drawer to be moved between ejected and retracted positions at the work station, and in which the drawer on any pan is latched in retracted position at all times except when being ejected or retracted, may be stated in general terms as including the combination of drawer-moving mechanism, means mounting said mechanism on the file support means at a location between opposed flights of orbital travel of the endless conveyor; the drawer-moving mechanism including a slide bar movable generally in a direction between home and extended positions parallel with the axes of the orbital path of conveyor travel; means for imparting slow-fast-slow movement in either direction to the slide bar; a column-acting, force-transmitting coil spring means thrustor element connected at one end to the other end of the thrustor in a direction normal to the plane of at least one of the flights of conveyor travel; magnet means mounted on said other end of the thrustor element; means extending through the thrustor element for energizing the magnet; tension cable means connected to the slide bar and magnet and extending through the thrustor element to limit stretching of said element; limit switch control means limiting movement of the slide bar in either direction; said control means also preferably including means to energize the magnet whenever the slide bar is away from home or retracted position; a spring-pressed drawer-slide handle having a rear magnet-engageable pad and a front handle member slidably mounted on each drawer and adapted to be magnetically engaged by the thrustor element and magnet whenever any drawer suspended on a pan is located at a predetermined position adjacent a work station; interlock means engageable between each drawer and its pan latching the drawer in retracted position, said drawer slide handle when moved forwardly releasing the drawer latch and moving the interlock means to safety position permitting ejection movement of the drawer; the interlock means also being engageable between each drawer and its pan to hold the interlock means in safety position so long at the drawer is away from retracted position; level switch means mounted on the frame actuated by one pan on the conveyor whenever another pan is located at predetermined position at said work station permitting operation of the drawer-moving mechanism whenever said other pan is so located at the work station; means for automatically operating said drawer-moving mechanism on arrival at the work station of a selected drawer and pan to eject the selected drawer to ejected position; and means for actuating the drawer-moving mechanism to move a drawer from ejected to retracted position.

By way of example, an embodiment of the improved automatic ejector power filing appliance construction is shown in the accompanying drawings forming part hereof in which:

FIG. 8 is a plan sectional view of the file taken on the line 8—8, FIG. 2, showing a pan at the work station with the drawer thereon in closed position and showing the general location of the drawer-moving mechanism;

FIG. 9 is a view similar to a portion of FIG. 8 but showing a drawer and the drawer-moving mechanism in ejected position;

FIG. 10 is a fragmentary view looking in the direction of the arrows 10—10, FIG. 8;

FIG. 11 is an enlarged fragmentary view with parts broken away of a portion of the thrusting mechanism moving around a corner as shown in FIG. 9;

FIG. 12 is an enlarged fragmentary view looking in the direction of the arrows 12—12, FIG. 9;

FIG. 13 is an enlarged plan view of a drawer on a pan with the drawer latched in closed position and the drawer-moving mechanism illustrated in dot-dash lines in fully retracted position;

FIG. 14 is a front view of the parts shown in FIG. 13;

FIG. 15 is a further enlarged view of the parts shown in FIG. 13 with parts broken away illustrating the latch mechanism in unlatched position after initial operation of the drawer-moving mechanism shown in dot-dash lines;

FIG. 22 is a fragmentary elevational view with parts broken away and in section illustrating several of the pans on the conveyor looking toward the left side of the middle portion of FIG. 2;

FIG. 23 is an enlarged plan view of the pan and drawer illustrating the drawer being moved from retracted to ejected position.

Similar numerals refer to similar parts throughout the various figures of the drawings.

Figure 1:
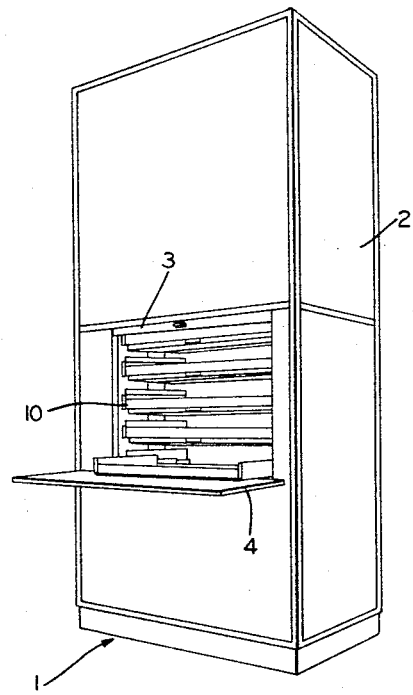
FIGURE 1 is a perspective view of a power filing appliance equipped with the improved automatic ejector construction or mechanism.

The improved automatic ejector-retractor mechanism for power files is illustrated and described in the drawings in connection with a power file of the general type shown in Krug et al. Pat. No. 3,116,366. Such a power file is indicated generally at 1 and may include a housing or cabinet 2, the front wall of which may be provided with an opening 3 above a counter or work station 4.

A pair of conveyor chains 5 trained over sprockets 6 and 7 mounted on upright support members 8 carried at 9 within housing 2 mount a series of pans 10 for movement in either direction in a continuous orbit of travel. Each pan 10 is mounted at each end on a pair of arms 11 fixed to a chain 5 and the arms 11 pivotally support an end of a pan 10 at 12. A stabilizing arm 13 is fixed to each end of each pan 10 having a roller 14 at its outer end. Rollers 14 engage and are guided in movement around the upper and lower ends of the path of conveyor travel by semicircular guide channels 15 and 16 to maintain pans 10 in a horizontal position throughout the upper and lower ends of the orbit of travel on conveyor 5 when traveling around the sprockets 6 and 7. Horizontal positioning of the pans 10 is maintained during travel in the vertical flights between sprockets 6 and 7 by engagement of a V-ear 17 at each end of one pan with the pivot shafts 12 of the pan next below.

Conveyor 5 is driven in a suitable manner from drive motor 18 (FIG. 8) which may be a reversing motor, operated preferably by selector switches and a rotary selector control switch, not shown, of a type such as disclosed in the Krug application, S.N. 276,711 filed April 30, 1963, now Patent No. 3,198,894. The construction and operation of the conveyor, housing, etc. also briefly described herein may be of the type shown in the Graber et al. application, S.N. 289,822 filed June 24, 1963, now Patent No. 3,199,658.

The power files shown in said applications, Serial Nos. 276,711 and 289,822, and in Pat. No. 3,166,366 comprise a plurality of pans mounted on an endless conveyor for movement in either direction in a continuous orbit of travel. Any selected pan is delivered by power operation of the conveyor opposite the work station 4. When delivered opposite such work station, heretofore a drawer on a suspension mechanism on its pan could be manually moved between retracted and an extended position such as shown in dot-dash lines at 19 in FIG. 2, and likewise could be moved manually from extended position 19 to a retracted position located in the path of the orbit of travel, such as shown in the full line position of pans 10 in FIG. 2.

In many installations of power files 1, it may be desired to provide for power driven or mechanical movement of a drawer supported on any pan located at the work station 4 between extended and retracted positions. However, power movement of drawers on pans movable in an endless orbit of travel in a power file of the type illustrated has been difficult to accomplish without increasing the size of the file or occupying space in front of the file, thereby increasing the effective floor space occupied by the file.

Figure 2:
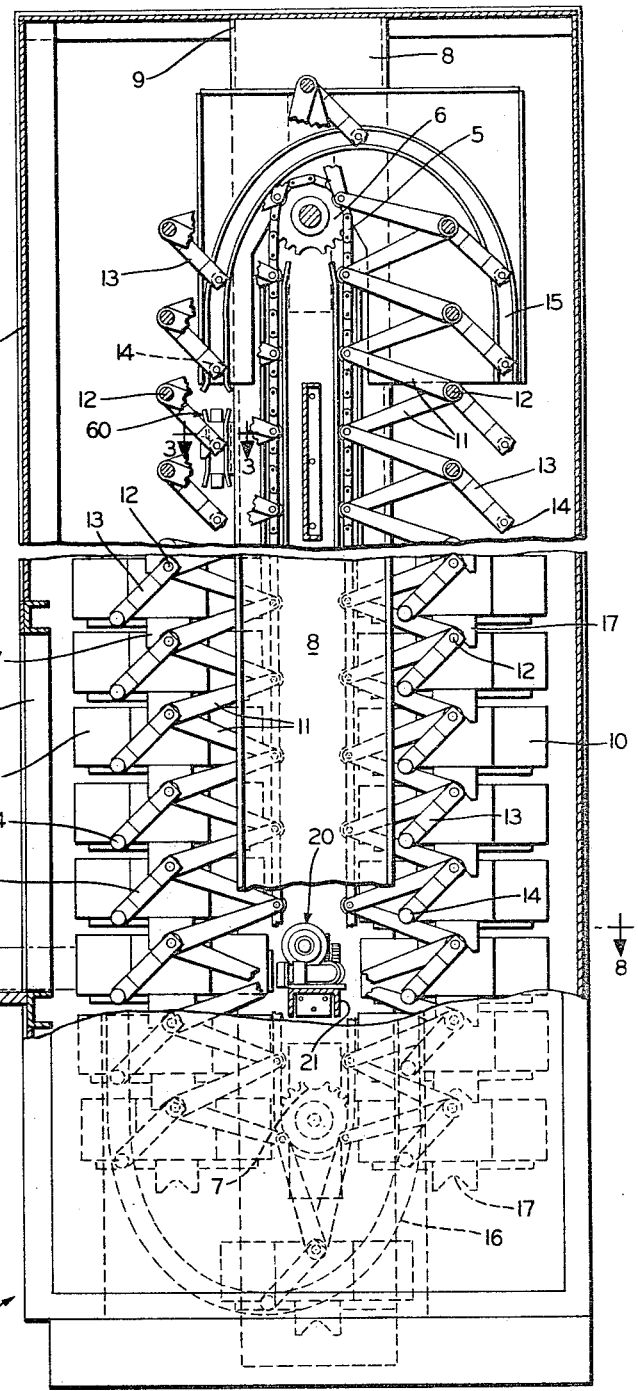
FIG. 2 is an enlarged side elevation with parts broken away and in vertical section at various locations looking from the right side of FIG. 1 and showing the pans in full lines in one sectional portion and showing the pan level control switch in full lines at another sectional portion.
Figure 21:
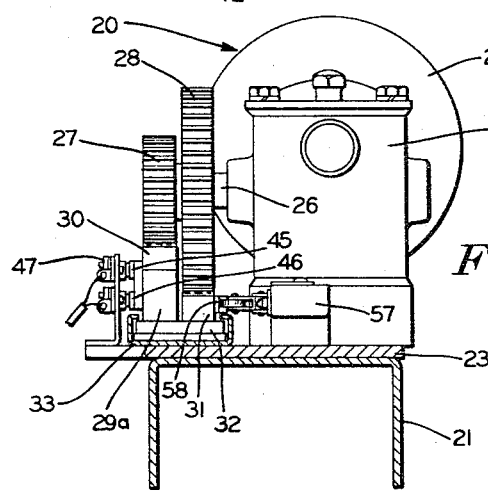
FIG. 21 is a fragmentary enlarged view looking in the direction of the arrows 21—21, FIG. 9.

In accordance with the invention, the power mechanism for moving a drawer positioned opposite the work station 4 between ejected and retracted positions is located between the rear or right of the pans 10 in the flight of travel at the left of FIG. 2 and the front or left of the pans in the flight of travel at the right of FIG. 2, as indicated generally at 20 in FIG. 2. Furthermore, referring to FIGS. 8 and 21 the power moving mechanism for the drawers is mounted and supported on a channel member 21 extending between the upright support members 8 at either end of power file 1 within cabinet or housing 2.

The drawer-moving mechaism 20 preferably includes a power operated reversing motor 22 mounted on a mounting plate or base 23 which in turn is mounted by bolts 24 (FIG. 8) on channel support member 21. Motor 22 through a gear reduction in box 25 drives the shaft 26 on which a smaller pinion 27 and a larger pinion 28 are fixed. Pinion 27 is adapted to mesh with spaced rack segments 29 or 30 while pinion 28 is adapted to engage rack segment 31 extending intermediate the locations of rack segments 29 and 30.

Rack segments 29, 30, and 31 are mounted on a slide bar 32 (FIG. 21) slidably mounted endwise in channel 33 also carried by mounting plate 23. Whenever motor 22 is energized, it rotates drive shaft 26 in one direction or another and, through engagement between one or the other of pinions 27 and 28 with rack segments 29, 30, and 31, moves slide bar 32 in one direction or the other, for instance, between the retracted position shown in FIG. 8 and the extended position shown in FIG. 9.

A block 34 is mounted by screws 35 (FIGS. 9 and 12) on the right-hand end of slide bar 32. Block 34 is provided with a central opening (FIG. 11) 36 and a sleeve 37. The end 28 of thrustor spring 29 is engaged over sleeve 37 to fixedly mount spring end 38 thereon. A tension cable 40 extends through opening 36 and is clamped at 41 to the base 29a of rack segment 29.

The ends of two wires of a power supply cable 42 are connected at 43 and 44 to contact rails 45 and 46 mounted in an insulated manner on one face of rack mounting base 29a. Power is supplied to rails 45 and 46 through contacts 47 (FIG. 9) in order to supply power to cable 42 which also extends through opening 36.

Tension cable 40 and electric cable 42 extend through thrustor spring 39 and the other end of tension cable 40 is fixed at 48 to a flanged sleeve 49 on the front of which an electromagnet 50 is mounted by screws 51. Power cable 42 is electrically connected with magnet 50 for energizing the magnet. The extended end of thrustor spring 39 is fixed at 52 around the sleeve of flanged sleeve 49 as shown in FIG. 11. The directions in which thrustor spring 39 extend are guided by guide sleeve 53 mounted at 54 on base 23 so that thrust on movement of bar 32 can be transmitted around a bend or corner from slide bar 32, which extends parallel with the file pans 10, through thrustor spring 39 to magnet 50 in a direction perpendicular to the pans 10.

Each file pan 10 mounted on the conveyor has a drawer 55 mounted by a usual suspension 56 on the pan so that the drawer 55 can be moved to an extended position, as indicated at 19 in FIG. 2, and as also is shown in FIG. 9, when a selected pan 10 is located opposite the work station 4.

Drawer movement between the positions shown in FIGS. 8 and 9 is accomplished through movement of slide bar 32 which transmits thrust or pull to any drawer 55 through thrustor spring 39 and tension cable 40. Connection is made or released between thrustor spring 39 and drawer 55 by energizing or de-energizing magnet 50. When the parts are in the position shown in FIG. 8, magnet 50 is always de-energized. Whenever slide bar 32 moves away from the "home" or retracted or "in" position of FIG. 8, the magnet 50 is energized.

Thrustor spring 39 preferably is wound with an initial tension so that it acts as a column in extending forwardly out of guide 53 as shown in FIG. 9. Spring 39 acting as a column transmits thrust to a drawer 55 from the slide bar 32 when the slide bar is moved from the retracted position of FIG. 8 to the extended or ejected or "out" position of FIG. 9.

During return movement of a drawer 55 from "out" position (FIG. 9) to "in" position of FIG. 8 (magnet 50 being energized and thereby connected with drawer 55), spring 39 initially is stretched slightly in length, say one-half inch, and then tension cable 40 takes over and transmits tensional pull between magnet 50 and slide bar 32.

The described arrangement performs two functions. First, the slight extension capability of spring 39 allows the spring to absorb inertia loading created when magnet 50 starts to pull drawer 55 (stationary in "out" position) back to a retracted position. This would tend to break the magnetic connection of magnet 50 with drawer 55 if such loading were not absorbed. Second, the tension cable 40 prevents damage to spring 39 from stretching the spring 39 too far. This would affect the action of the spring as a column if overstretching is not prevented.

Thus, the drawer-moving mechanism 20 includes an electromagnet 50 for rapid connection or disconnection with a drawer 55 when desired. Drawer-moving forces are transmitted between the slide bar 32 and the drawer 55 in a push-pull manner around a corner through thrustor spring 39 to push, and through spring 39 and then tension cable 40 to pull. Meanwhile, tension cable 40 and power supply line 42 for electromagnet 50 extend through the center of thrustor spring 39 and around the corner. In this manner the drawer-moving mechanism 20 may be mounted in the confined space available in the file construction between the two flights defining the paths of pan travel on the conveyor.

The drive arrangement between motor 22 and slide bar 32 including the pinions 27 and 28 and rack segments 29, 30, and 31 provide for slow-fast-slow movement of slide bar 32 and, therefore, of drawer 55 in either direction between the limits of movement. The central rack 31 and pinion 28 engagement transmits high speed movement to slide bar 32, while the engagement between pinion 27 and rack segments 29 and 30 transmits slow speed movement to slide bar 32. Pinions 27 and 28 are integral with each other and one is engaged with a rack segment until the other becomes engaged with its rack segment.

The speed change is desirable for a number of reasons. A slow speed for the beginning of movement of drawer 55 from the "in" position of FIG. 8 toward "out" position is desirable to ease the impact of engagement by magnet 50 with drawer 55. After motion of drawer 55 has started, high speed is desirable to decrease cycle time. Then dropping to slow speed decreases the amount of impact loading on the stops which limit outward drawer movement on suspension mechanism 56 for drawer 55 on pan 10. The same considerations of desirable slow-fast-slow movement also are involved in retracting any drawer from "out" position to "in" position.

Although the slow-fast-slow speed arrangement has been disclosed as being obtained by the rack and pinion mechanisms illustrated, a two-speed electric motor directly driving slide bar 32, or other forms of variable speed drives, may be used so long as the slow-fast-slow speed drive is accomplished.

Figure 24:
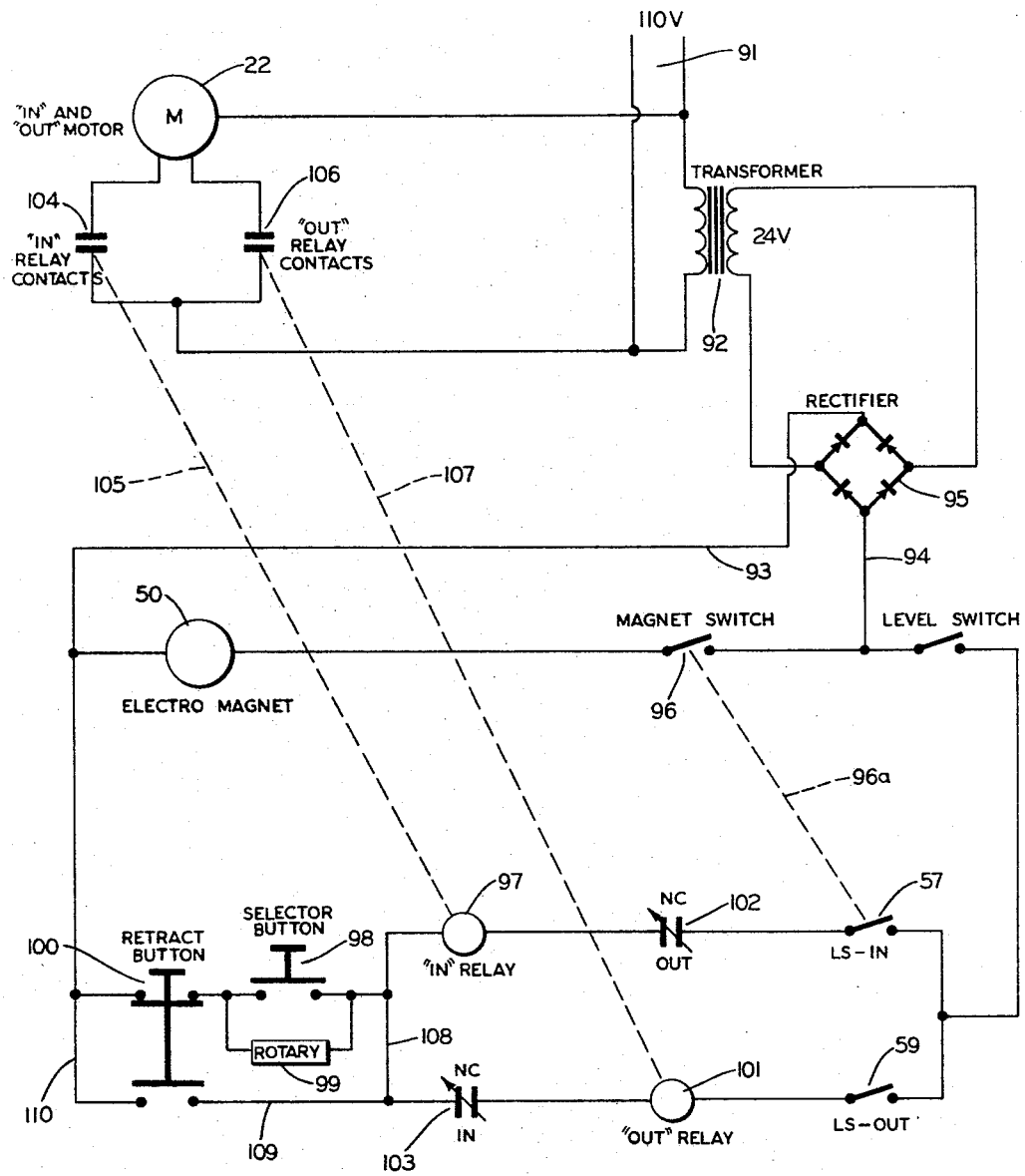
FIG. 24 is a wiring diagram for the ejector mechanism.

A limit switch 57, which may be termed as "in" limit switch, is mounted on base plate 23 in position to be actuated by the left-hand end of actator projection 58 mounted on a side face of rack 31. Another or "out" limit switch 59 also is mounted on base plate 23 in position to be actuated by the right-hand end of actuator 58. Switch 57 is actuated when slide bar 32 and drawer 55 are in the "in" position shown in FIG. 8 and switch 59 is actuated by actuator 58 when slide bar 32 and drawer 55 are in the "out" position of FIG. 9. Operation of switches 57 and 59 will be described below in connection with the description of the wiring diagram of FIG. 24.

Figure 4:
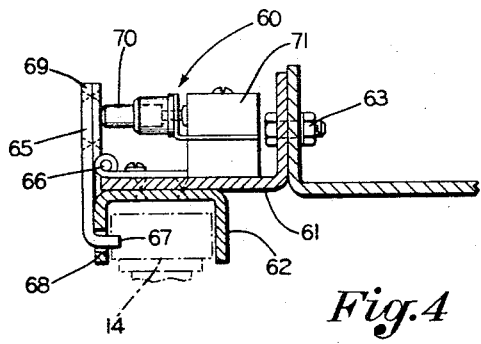
FIG. 4 is a view similar to FIG. 3 showing the parts in another position.
Figure 3:
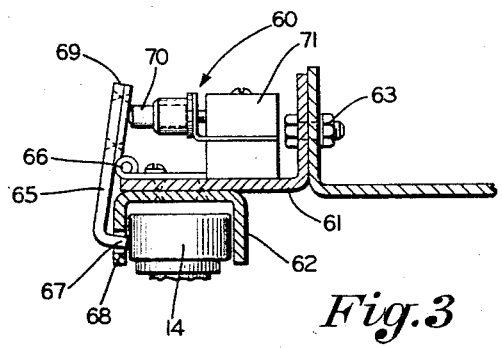
FIG. 3 is an enlarged fragmentary sectional view taken on the line 3—3, FIG. 2.
Figure 5:
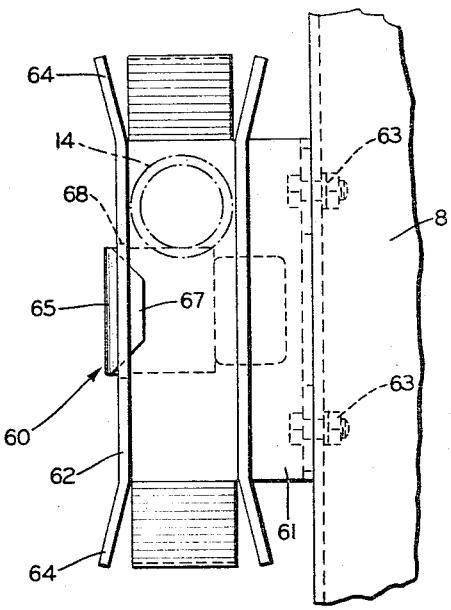
FIG. 5 is a front view of the parts shown in FIG. 4.
Figure 6:
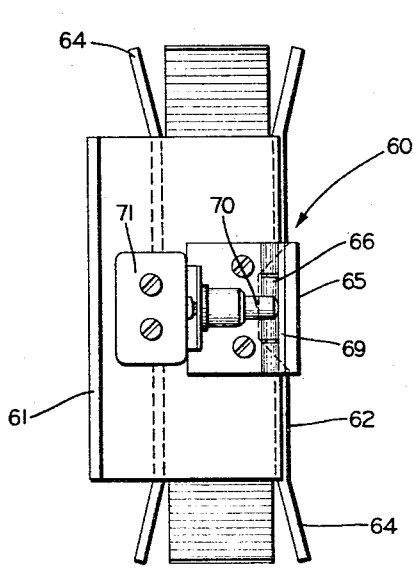
FIG. 6 is a rear view of the parts shown in FIG 4.
Figure 7:
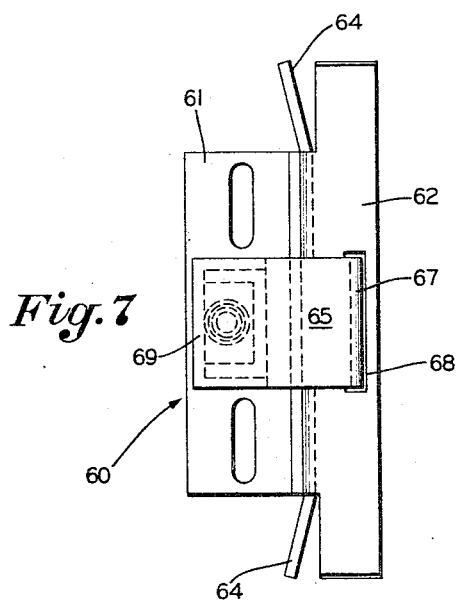
FIG. 7 is a side elevation looking toward the right side of FIG. 6.

Referring to FIGS. 2 to 7 a level controller generally indicated at 60 is mounted adjacent the path of conveyor travel. The level controller 60 preferably includes an angle member 61 having channel member 62 mounted thereon, both being carried by bolts 63 on one of the upright support members 8. Channel member 62 has its web and flanges outwardly flared at each end, as indicated at 64, so as to successively guide and trap the stabilizing roller 14 for each pan within channel 62 during conveyor movement. An L-shaped trigger actuator 65 is pivoted at 66 on angle member 61 and has its foot 67 normally projecting through slot 68 in channel member 62 in position to be engaged by a pan stabilizing roller 14 when centrally located in channel 62, as shown in FIGS. 3 and 4. When trigger actuator 65 is engaged by a roller 14 as shown in FIG. 3, its other end 69 depresses switch button 70 of level switch 71.

Level switch 71 functions as an interlock or safety device insuring that a pan is at a proper level to be ejected or moved to "out" position, such as the pan 55 indicated in dot-dash lines in FIG. 2 at the work station 4. The spacing between pans 10 on the conveyor is uniform in the vertical paths of travel, so that when one pan has its stabilizer roller 14 trapped in level controller 60 as indicated in FIG. 2, another pan 10 is opposite work station 4 and in position for its drawer 55 to be engaged by the drawer-moving mechanism 20 also as indicated in FIG. 2. When so located, the stabilizer roller 14 trapped in level controller 60 actuates level switch 71 to control operation of the drawer-moving mechanism 20 as described below.

Figure 16:
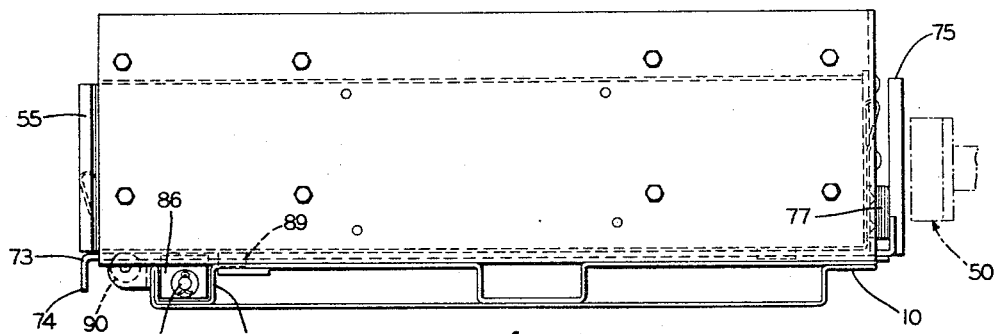
FIG. 16 is a side view of the parts shown in FIG. 13.
Figure 17:
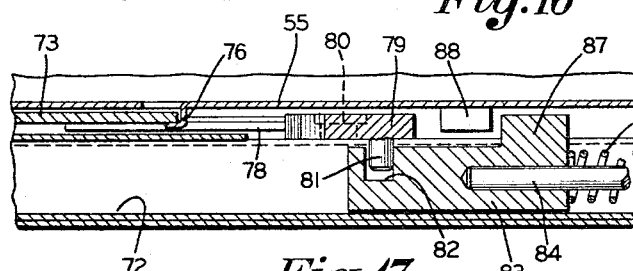
FIG. 17 is a fragmentary sectional view taken on the line 17—17, FIG. 15.
Figure 18:
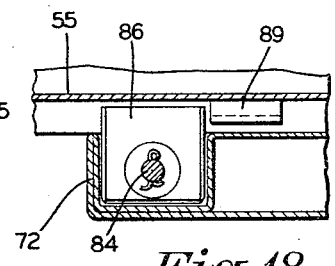
FIG. 18 is a fragmentary sectional view looking in the direction of the arrows 18—18, FIG. 15.
Figure 19:
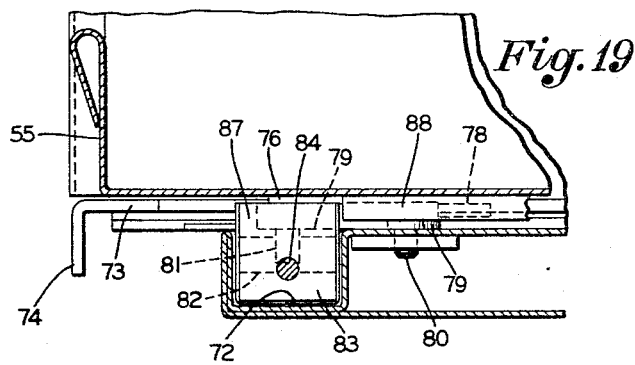
FIG. 19 is a fragmentary sectional view taken on the line 19—19, FIG. 13.

Referring to FIGS. 13 to 20 and FIG. 23, each pan 10 (FIG. 16) preferably is provided with a base having a channel 72 extending crosswise of the front of the pan (left end of FIG. 16). A movable drawer handle 73 having a downturned handle flange 74 at its front end and an upturned flange pad 75 at its rear end is slidably mounted extending generally centrally from front to rear of each drawer 55 on slide guide tabs 76 formed in the bottom wall of the drawer. Drawer handle 73 normally is spring-pressed toward the rear of drawer 55 by spring 77 (FIG. 13).

Figure 20:
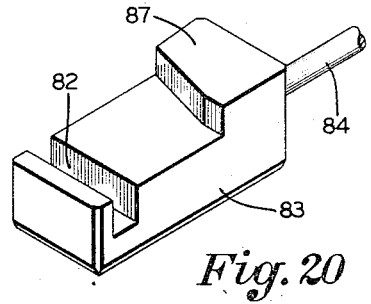
FIG. 20 is a fragmentary perspective of one of the interlocking latch parts.

A latch release actuator lug 78 projects to one side of slide handle 73 near the front of the handle, in position to engage a lever 79 pivotally mounted at 80 on the base of pan 10 (FIG. 13). Lever 79 is formed with a downwardly projecting pin 81 (FIG. 17) adjacent its free end which is engaged in slot 82 formed in interlock slide 83 slidably mounted in channel 72. Interlock member 83 is fixed to one end of a control rod 84 which is normally spring-pressed by spring 85 toward the left of the pan 10 and drawer 55. Rod 84 also preferably carries a stop collar 86 slidable in channel 72 near the right-hand end of pan (FIGS. 13–15). A stop lug 87 is formed on interlock member 83 projecting upwardly therefrom as shown in FIG. 20.

When slide handle 73 is in the position of FIG. 13 and drawer 55 is closed, rod 84 is spring-pressed toward the left and stop 87 is in front of an elongated lock bar 88 mounted on the undersurface of drawer 55. Also, stop collar 86 is in front of a downturned stop ear 89 mounted on the undersurface of drawer 55. Thus, stop members 87 and 86, when engaging members 88 and 89, respectively, prevent drawer 55 from being moved outward until such time as rod 84 is moved from the position of FIG. 13 to the right to the position of FIG. 15 in order to remove stop members 87 and 86 from in front of stop bar 88 and stop lug 89.

Movement of rod 84 to the right is accomplished by moving slide handle 73 forwardly of drawer 55 against the pressure of spring 77 from the position of FIG. 13 to that of FIG. 15. Lug 78 engages lever 79 and swings the same so that pin 81 in slot 82 of interlock member 83 moves rod 84 to the right. When this movement of the interlocking mechanism has taken place, the drawer 55 may be moved outwardly of its carrying pan 10 supported on suspension mechanism 56 and front rollers 90. After drawer 55 moves forwardly on pan 10 from the "in" position of FIG. 15 toward "out" position as illustrated in FIG. 23, stop bar 88 engages stop lug 87 on interlock member 83 to hold rod 84 projected toward the right as shown in FIG. 23.

Thus, any drawer 55 may be released from latched position when "in," by forward movement of slide handle 73, either by manually grasping the handle flange 74 to pull the handle toward the left (FIGS. 16 and 19); or by thrust from thrustor spring 39 to engage magnet 50 with pad 75 at the rear of slide handle 73 as shown in FIGS. 13, 15, and 23. During initial movement of slide handle 73, as described, the drawer is first unlatched. Then drawer movement form "in" to "out" position is accomplished. After unlatching, control rod 84 is interlocked and held in the projected position shown in FIG. 23 by stop bar 88 for a purpose to be described.

Limit switch 57 for the drawer retracted or "in" position is a two-pole switch having one pole controlling the limit of drawer retracting movement and the other pole controlling operation of electromagnet 50. Limit switch 59 for the "out" or ejected position of the drawer is a single pole switch. Level switch 71 also is a single pole switch. Power supply for motor 22 and magnet 50 is indicated in the wiring diagram (FIG. 24) by lines 91 which are connected with transformer 92 to supply direct current through lines 93 and 94 from the rectifier 95 to magnet 50. Magnet switch 96 in the line 94 circuit to magnet 50 comprises one pole of the limit switch 57 as indicated by the dotted line 96a. The other pole LS–IN of limit switch 57 is in circuit with level switch 71, an "in" relay coil 97, the pan selector buttons such as button 98, and pan rotary switch 99 and a retract button 100, the circuit being supplied with power from lines 93 and 94. The single pole LS–OUT of limit switch 59 is in another circuit with switch 71, an "out" relay coil 101, selector button 98, rotary switch 99 and retract button 100.

Switches 102 and 103 asosciated with relays 101 and 97, respectively, form an electrical interlock so that when "in" relay 97 is energized, "out" relay 101 cannot be energized, and vice versa. "In" relay 97 controls contacts 104 in the winding of reversing motor 22 providing retracting movement of the motor as indicated by dotted line 105. "Out" relay 101 similarly controls contacts 106 in the other winding of motor 22 providing ejector movement of the motor as indicated by dotted line 107.

Contacts 104 and 106 are normally open. The poles 96 and LS–IN of limit switch 57 are open when switch 57 is tripped by actuator 58, and are closed when actuator 58 moves away from switch 57 upon movement of slide bar 32 away from "home" or retracted position. Thus, when switch 57 is closed, magnet switch 96 also is closed energizing the magnet 50 at all times when slide bar 32 is away from "home" position. In this manner magnet 50 always makes magnetic driving connection with a drawer 55 at all times when slide bar 32 of drawer-moving mechanism 20 is away from "home" position.

Limit switch 59 is open when tripped by actuator 58, and is closed when actuator 58 moves away from switch 59 upon movement of slide bar 32 away from ejected position. Level switch 71 is normally open but is closed whenever a stabilizing roller 14 is trapped in level controller 60.

When the conveyor is running, controls forming part of rotary switch 99 prevent motor 22 from being energized as each roller 14 passes through level controller 60 and until the selected pan 10 be delivered to work station 4 arrives and stops at work station 4.

The particular construction and arrangement of rotary switch 99 and selector switch 98 form no part of the invention except that there preferably will be one momentary selector switch 98 for each pan 10 associated with the rotary switch 99, and the switches 98 and 99 may be constructed and operated as shown and described in said application Serial No. 276,711.

The operation of the improved construction may be understood by assuming that elements of the file 1 are in the positions of FIGS. 2 and 8. A particular pan 10 has been moved by the conveyor to a location opposite work station 4. This has been accomplished by previously momentarily pressing the selector button 98, which, along with the operation of rotary switch 99 and motor 18 controlled by the rotary switch 99, delivers to the work station the pan 10 associated with the selector button depressed. When the conveyor stops, a roller 14 on the stabilizing arm 13 of another pan 10 on the conveyor above the delivered pan 10 is located trapped in level controller 60 as shown in FIG. 2. This closes level switch 71.

Meanwhile, limit switch 59 has been in closed position. Upon closing of switch 71, a circuit is established from line 94, through switch 71, switch 59, "out" relay 101 and rotary switch 99 to line 93. When relay 101 is energized, "out" relay contacts 106 are closed and motor 22 runs to move slide bar 32 to the right (FIG. 8). As soon as bar 32 starts to move, actuator 58 releases limit switch 57, the two poles 96 and LS–IN of which close. Closing of switch 96 energizes magnet 50. Although LS–IN closes, relay 97 is not energized since switch 102 is held open by "out" relay 101.

Motor 22 continues to run, magnet 50 engages pad 75 on the slide handle 73 of the drawer 55 on the selected pan, and the drawer-moving mechanism 20 closes the gap at the rear between pad 75 and the drawer 55. The drawer-moving mechanism at this time is in the initial slow movement of operation. During this initial movement, slide 73, lever 79, interlock slide 83 and related elements move from the position of FIG. 13 to that of FIG. 15 releasing the drawer latch which then permits drawer 55 to move outward to the ejected position of FIG. 9 and as indicated at 19 in FIG. 2. The drawer movement meanwhile passes through the fast and final slow phases of movement.

As drawer 55 arrives at the ejected postion of FIG. 9, actuator 58 engages limit switch 59, opening the switch, de-energizing relay 101, opening contacts 106 and stopping motor 22.

As long as the drawer 55 is away from a latched position, bar 88 holds stop lug 87 of interlock slide 83 in the position shown in FIG. 23 with rod 84 projected toward the right. This poistion of control rod 84 may be used to actuate safety switch means preventing operation of drive motor 18 of the file conveyor so long as the drawer is out of latched position. Such safety switch means may be of the type shown in Patent No. 3,166,366.

As long as the drawer 55 is away from retracted position, magnet 50 is energized and magnetically engaged with pad 75 of the drawer slide handle 73. Thus, when motor 22 is energized to provide retraction movement, the drawer-moving mechanism 20 through magnet 50 and tension cable 40 pull the drawer back to retracted position. Such drawer retraction may be accomplished in either of two ways.

First, retract button 100 may be momentarily depressed, by-passing rotary switch 99 and establishing a circuit through line 94, switches 71 and 57, relay 97 and lines 108, 109 and 110 to line 93. Energizing relay 97 closes "in" relay contacts 104 which starts motor 22 to run in the direction to provide "in" or retraction movement for the drawer. When drawer 55 reaches retracted position of FIG. 8, actuator 58 trips switch 57 which opens, de-energizing relay 97, opening contacts 104 and stopping motor 22. When switch 57 opens, magnet switch 96 also opens de-energizing magnet 50 which is thus released from the pad 75 on the retracted drawer and thrustor spring 39 pulls magnet 50 back to the position of FIGS. 2 and 8 clear of the drawer 55 and the pan 10 on which the drawer is suspended so that the conveyor can be moved without interference by the drawer-moving mechanism 20.

Alternately, a selector button 98 for another pan may be depressed, not only to retract the drawer from ejected position as described, but also to start conveyor movement when the drawer reaches retracted position, and to deliver a newly selected pan to the work station.

Of course, it is clear that with the conveyor stopped as in FIG. 2 if it is desired, any drawer opposite opening 3 may be manually moved to "out" position by merely grasping the handle flanges 74 of the slide handle 73 of the desired drawer and pulling out, thereby initially unlatching the drawer and then moving the drawer to extended position. Projection of control rod 84 associated with such manually moved drawer prevents conveyor movement as previously described.

The improved construction combines a number of important aspects or concepts. The drawer-moving mechanism, located between the flights of travel of the power file, does not require additional or otherwise usable space. It includes a power operated thrust mechanism which moves around a corner and is magnetically attached to or detached from the drawer to be moved without requiring any special mechanical push-pull coupling means to be provided on each drawer for selective interengagement with the thrustor. The thrustor formed by a pretensioned coil spring not only can move around a corner, but also cushions impact loading in either direction, and also permits a pull tension cable and a power cable for the magnet to extend through the spring. The moving mechanism in addition provides for slow-fast-slow drawer movement in either direction of a drawer being moved between extended and retracted positions. The cushioning thrustor spring and tension cable permit the slow-fast-slow movement to be transmitted with impact loading absorption, while the thrustor acts as a column when pushing and stretches (limited by tension cable) when pulling.

Any drawer itself may be moved manually or by power. The spring-pressed drawer handle first is moved to unlatch the drawer and then to move the drawer. The drawer is interlocked preventing drawer movement when the conveyor is moving or subject to being moved and preventing conveyor movement when any drawer is not in latched condition.

The control mechanisms provides for automatic ejection of a selected drawer upon delivery of such drawer on the conveyor to a work station; pjrovides for retraction of the drawer when desired; provides for automatic retraction ad delivery of another selected drawer when desired; provides safety mechanisms for insuring that the selected pan is in proper position to be ejected before ejection can occure; and provides for driving connection between the drawer-moving mechanism and any selected drawer at all times when the drawer is away from latched position or the moving mechanism is away from "home" position.

Accordingly, the present invention provides an improved automatic ejector construction for the drawers of a power filing appliance that avoids the various difficulties and eliminates requirements heretofore involved concerning prior filing appliance drawer-moving mechanisms; provides simple and readily operated mechanisms for automatically moving drawers on suspensions on pans carried by a conveyor having orbital movement, between extended and retracted positions, when any selected drawer arrives at a work station, and without requiring additional space for the ejector-retractor mechanisms; provides a new construction achieving the objectives set forth above; provides a new construction combining the particular concepts described; and provides a new construction accomplishing the many new functions and results described, and solving problems existing in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structures shown, because the various parts, components and mechanisms may be varied to provide other structural embodiments, without departing from the fundamental concepts, aspects and principles of the invention.

Having now described the features, discoveries and principles of the invention, the construction, assembly, characteristics, operation and use of a preferred form thereof, and the advantageous, new and useful results obtained thereby; the new and useful discoveries, principles, apparatus, combinations, parts, elements, subcombinations, structures, cooperative relationships and arrangements, and mechanical equivalents obvious to those skilled in the art are set forth in the appended claims.

We claim:

1. Power-operated, ejector-retractor construction for a power file of a type in which a plurality of pans are mounted on an endless conveyor carried by support means for movement in either direction in a continuous orbit of travel having at least one flight of travel in a plane extending parallel with the orbital axes and any selected pan is delivered by power means to a predetermined work station location, and in which a drawer is supported on each pan on suspension mechanism which permits the drawer to be moved between ejected and retracted positions at the work station; the construction including in combination, drawer-moving mechanism, means mounting said mechanism on the file support means adjacent the work station and between flights of orbital conveyor travel, drawer latch means interengageable between each drawer and its pan and including a handle slide latch actuator, the drawer-moving mechanism including thrustor means having an electromagnet engageable and disengageable with the handle slide of a drawer located at said predetermined work station location and movable in a direction normal to the plane of said one flight of conveyor travel to eject and retract such drawer and to unlatch said latch means for drawer ejection and retraction, and control means for said drawer-moving mechanism including limit switch means and means operative automatically upon arrival of a preselected pan at said predetermined work station location to initiate ejector movement of said thrustor means.

2. The construction defined in claim 1 in which the thrustor means is flexible, and means is provided to move the thrustor means around a corner to project the electromagnet in a direction normal to the plane of one flight of conveyor travel.

3. The construction defined in claim 1 in which the thrustor means includes a column-acting, force-transmitting coil spring, a slidable bar connected to one end of the spring, and means for moving the bar between extended and retracted positions; in which the electromagnet is connected to the other end of the spring; and in which means is provided to guide thrusting movement of the spring around a corner to project the electromagnet in a direction normal to the plane of conveyor travel.

4. The construction defined in claim 3 in which a cable is provided extending through the spring to supply power to the magnet to energize the magnet.

5. The construction defined in claim 3 in which a tension cable is connected to the bar and magnet and extends through the spring to limit stretching of the spring during retracting movement thereof.

6. The construction defined in claim 1 in which the drawer-moving mechanism includes a slide bar movable between home and extended positions generally in a direction parallel with the orbital axes, and in which the thrustor means is connected to and movable with said slide bar.

7. The construction defined in claim 6 in which the drawer-moving mechanism includes means for imparting slow-fast-slow movement in either direction between home and extended positions to the slide bar.

8. The construction defined in claim 7 in which the means for imparting slow-fast-slow movement includes two spaced end rack segments and an intermediate rack segment on the slide bar, a reversing motor, a large diameter and a small diameter gear on a common axis fixed to each other and driven by said motor, the large gear being adapted drivingly to engage to intermediate rack segment, and the small gear being adapted drivingly to engage the spaced end rack segments.

9. The construction defined in claim 6 in which the control means limit switch means includes an out limit switch and an in limit switch mounted on said mounting means, and limit switch actuator means mounted on said slide bar engageable selectively with said limit switches on movement of said bar to limit ejecting and retracting movement of said thrustor means.

10. The construction defined in claim 9 in which the in limit switch includes a pole controlling power supply to the magnet and in which said switch pole is closed to energize the magnet at all times except when the in limit switch is engaged by the limit switch actuator means at the limit of retracting movement of said thrustor means.

11. The construction defined in claim 1 in which the control means operative automatically upon arrival of a preselected pan at a predetermined work station location includes a level switch in the path of conveyor travel and a switch actuator carried by the conveyor and connected with a pan spaced from the preselected pan a predetermined distance to actuate said level switch on arrival of the preselected pan at the work station.

12. The construction defined in claim 1 in which the handle slide latch actuator for each drawer is spring-pressed normally toward drawer retracted position and is slidably mounted on its drawer, in which the handle slide is provided with a rear magnet-engageable pad and a front handle member, and in which the handle slide engages the drawer latch means to unlatch the drawer upon movement of the handle slide relative to the drawer by the thrustor means away from retracted position to permit movement of the drawer by the thrustor means to ejected position.

13. The construction defined in claim 1 in which the drawer latch means includes interlock means and a file safety actuator, and in which the interlock means holds the drawer latched whenever the safety actuator is in inoperative position and holds the safety actuator in safety position whenever the drawer is unlatched and away from retracted position.

14. The construction defined in claim 1 in which a bell crank actuated interlock member is slidably mounted on each pan for movement between latching and safety positions having a latch projection and a safety actuator rod extending from the member, in which spring means is provided normally pressing the member to latching position, in which the drawer has bar means engaging the latch projection holding the drawer latched when the member is in latching position, the bar means engaging the latch projection holding the safety actuator rod in safety position whenever the drawer is away from retracted position; and in which the drawer handle slide on movement away from retracted position engages the bell crank to move the interlock member from latching to safety position.

15. The construction defined in claim 1 in which the control means also includes means for actuating the drawer-moving mechanism to move the drawer from ejected to retracted position whenever a drawer is located in ejected position.

16. The construction defined in claim 1 in which the control means includes a conveyor actuated level switch permitting operation of the drawer-moving mehanism only when a selected pan is at a predetermined work station location.

References Cited by the Examiner
UNITED STATES PATENTS

| | | | |
|---|---|---|---|
| 2,751,093 | 6/1956 | Thiebault | 214—16.1 |
| 3,063,769 | 11/1962 | Graber | 312—223 |
| 3,166,366 | 1/1964 | Krug et al. | 312—223 |
| 3,198,894 | 8/1965 | Krug | 200—11 |
| 3,199,658 | 8/1965 | Graber et al. | 198—137 |
| 3,235,319 | 8/1966 | Anders et al. | 312—223 |

CLAUDE A. LE ROY, *Primary Examiner.*

CHANCELLOR E. HARRIS, *Examiner.*